US008326799B2

(12) United States Patent
Feldman et al.

(10) Patent No.: US 8,326,799 B2
(45) Date of Patent: Dec. 4, 2012

(54) DATA DISTRIBUTION IN SYSTEMS WITH MULTIPLE STORAGE ENTITIES

(75) Inventors: Timothy Richard Feldman, Louisville, CO (US); Wayne Howard Vinson, Longmont, CO (US); Jonathan Williams Haines, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 424 days.

(21) Appl. No.: 12/576,552

(22) Filed: Oct. 9, 2009

(65) Prior Publication Data

US 2011/0087631 A1    Apr. 14, 2011

(51) Int. Cl.
*G06F 17/00* (2006.01)
*G06F 7/00* (2006.01)
(52) U.S. Cl. ........................................................ 707/610
(58) Field of Classification Search .................... 707/610
See application file for complete search history.

(56) References Cited

U.S. PATENT DOCUMENTS

| 2004/0064633 | A1* | 4/2004 | Oota ............................... 711/100 |
| 2005/0065961 | A1* | 3/2005 | Aguren .......................... 707/102 |
| 2008/0016276 | A1* | 1/2008 | Hong .............................. 711/115 |
| 2008/0140883 | A1 | 6/2008 | Salessi et al. |
| 2008/0140919 | A1* | 6/2008 | Torabi et al. ................... 711/103 |
| 2008/0209116 | A1 | 8/2008 | Caulkins |
| 2008/0222371 | A1 | 9/2008 | Caulkins |
| 2010/0115185 | A1* | 5/2010 | Ono et al. ...................... 711/103 |

* cited by examiner

*Primary Examiner* — Kimberly Wilson
(74) *Attorney, Agent, or Firm* — Alan G. Rego; Westman, Champlin & Kelly, P.A.

(57) ABSTRACT

The disclosure is related to systems and methods of distributing data in devices with multiple storage entities. In a particular embodiment, a system is disclosed that includes multiple storage entities, with each storage entity having a sub-controller. A controller is communicatively coupled to each of the multiple storage entities. The controller is configured to send at least one of a respective copy of data or metadata associated with the respective copy of the data to each of the multiple storage entities. Upon receipt of the at least one of the respective copy of the data or the metadata associated with the respective copy of the data, each sub-controller provides storage competency information of the respective storage entity for the respective copy of the data. Upon receiving storage competency information for the multiple storage entities, the controller selects a particular one of the multiple storage entities and notifies the selected storage entity to store the respective copy of the data.

17 Claims, 3 Drawing Sheets

DATA DISTRIBUTION IN SYSTEMS WITH MULTIPLE STORAGE ENTITIES

FIELD OF THE DISCLOSURE

The present disclosure is generally related to managing data storage into memories. Further, the present disclosure is also generally related to data distribution in systems with multiple selectable storage entities.

DETAILED DESCRIPTION

Figure 1:
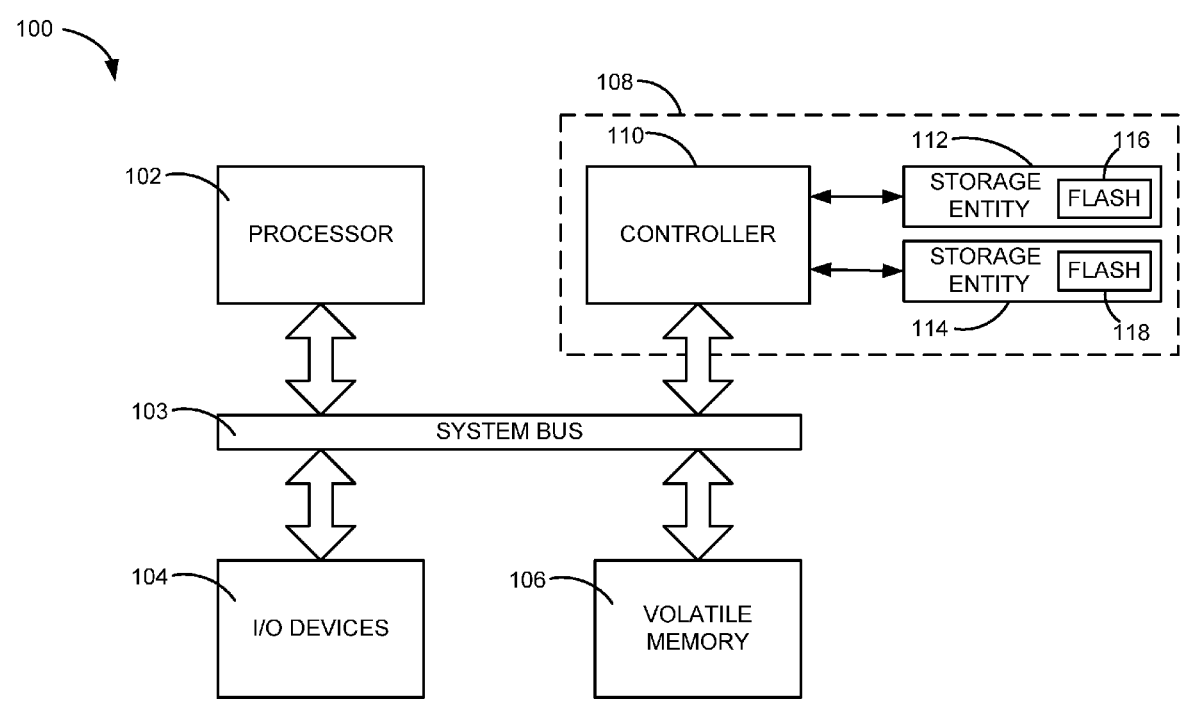
FIG. 1 is a diagram of an illustrative embodiment of a system of data distribution management.

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

The disclosure is related to data distribution in systems with multiple storage entities. As used herein, a storage entity is a component that includes one or more memories and circuitry that is capable of providing storage competency information of the storage entity for data received for storage in its one or more memories. The systems and methods described herein are particularly useful for flash memory systems; however, the systems and methods described herein can be applied to any type of memory system to improve data distribution. In some embodiments, each of the multiple storage entities is included in a different one of multiple parallel-connected channels.

In the field of data storage systems, devices such as disc drives and tape drives typically have a single channel to the data storage medium, making many of these disc drives inherently single threaded for storage access. Advanced solid state drives, however, typically have multiple parallel-connected channels each of which provides access to one or more flash devices. To provide data distribution, high performance solid state drives exploit hardware parallelism by providing, for example, flexible logical-to-physical mapping schemes that allow perhaps any logical block to go to any channel. However, such methods may perform suitably when the parallelism has relatively equal capability and/or availability, but may not be optimal when capability and/or availability vary across the parallel channels. In general, in devices with multiple memories, a method for optimal data distribution is needed.

In a particular embodiment, a system is disclosed that includes multiple storage entities, with each storage entity having a sub-controller. A controller is communicatively coupled to each of the multiple storage entities. The controller is configured to send at least one of a respective copy of data or metadata associated with the respective copy of the data to each of the multiple storage entities. Upon receipt of the at least one of the respective copy of the data or the metadata associated with the respective copy of the data, each sub-controller provides storage competency information of the respective storage entity for the respective copy of the data. Upon receiving storage competency information for the multiple storage entities, the controller selects a particular one of the multiple storage entities and notifies the selected storage entity to store the respective copy of the data.

In another particular embodiment, a method is disclosed that includes sending at least one of a respective copy of data or metadata associated with the respective copy of the data to each of multiple storage entities. The method also includes generating, in the multiple storage entities, storage competency information of the respective storage entity for the respective copy of the data. The method further includes selecting a particular one of the multiple storage entities to store the respective copy of the data based upon storage competency information of the multiple storage entities.

In yet another particular embodiment, a system is disclosed that includes multiple channels, with each channel including at least one memory. A controller is communicatively coupled to each of the multiple channels, with the individual channels of the multiple channels being in parallel with each other. The controller is configured to send at least one of a respective copy of data or metadata associated with the respective copy of the data to each of the multiple channels. Upon receipt of the at least one of the respective copy of the data or the metadata associated with the respective copy of the data, each channel provides storage competency information for the respective copy of the data. Upon receiving storage competency information for the multiple channels, the controller selects at least one of the multiple channels and notifies the selected at least one of the multiple channels to store the respective copy of the data.

Referring to FIG. 1, a particular embodiment of a system of data distribution management is shown and generally designated 100. The system of data distribution management 100 may include a processor 102 connected to a system bus 103 which also can be connected to input/output (I/O) devices 104, such as a keyboard, monitor, modem, storage device, or pointing device. The system bus 103 may also be coupled to a memory 106, which may be a random access volatile memory, such as dynamic random access memory (DRAM). The system bus may also be coupled to a memory device 108. In a particular embodiment, the memory device 108 comprises multiple storage entities that may include, for example, non-volatile flash memory.

The memory device 108 may include a controller 110, which may be coupled to the processor 102 via a connection through the system bus 103. As indicated above, the memory device 108 may also contain multiple storage entities 112 and 114. In a particular embodiment, storage entities 112 and 114 include at least one flash memory 116, 118.

During operation, the processor 102 may send a command and data to the memory device 108 to retrieve or store data. The controller 110 can receive the command and data from the processor 102 and then manage the execution of the command to store or retrieve data from storage entities 112 and 114.

In some embodiments, controller 110 of device 108 is capable of recognizing a variance in capability among storage entities such as 116 and 118 and selecting storage destinations based on a "best" cost-benefit ratio at any point in time. This applies most straightforwardly to selecting a destination for a write, but can also apply to selecting a source for a read when data are available from multiple locations due to some form of data redundancy.

In general, some data storage capabilities may be well understood, or only understood, by controller 110 that makes a storage entity selection decision. In devices that include flash memory, write destinations typically should be to the least worn location for purposes of endurance and data retention, and this may be traded off with availability of storage entities. In some embodiments, controller 110 tracks wear on erasure blocks as well as availability of storage entities, so the costs (wear) and benefit (concurrency) decisions typically can be made independently from any additional information from the storage entities. Other storage entity characteristics that may be known by the controller 110 include power, which can influence selection of a storage entity in order to minimize power or keep device power below a predetermined ceiling. Power may differ among storage entities when the devices included in any one storage entity are homogeneous (all dissipate the same power for a given access type) while the characteristics among storage entities are heterogeneous (some dissipate more and some less power) such as when each storage entity contains either all multi-level cell (MLC) or all single-level cell (SLC) flash devices.

Figure 2:
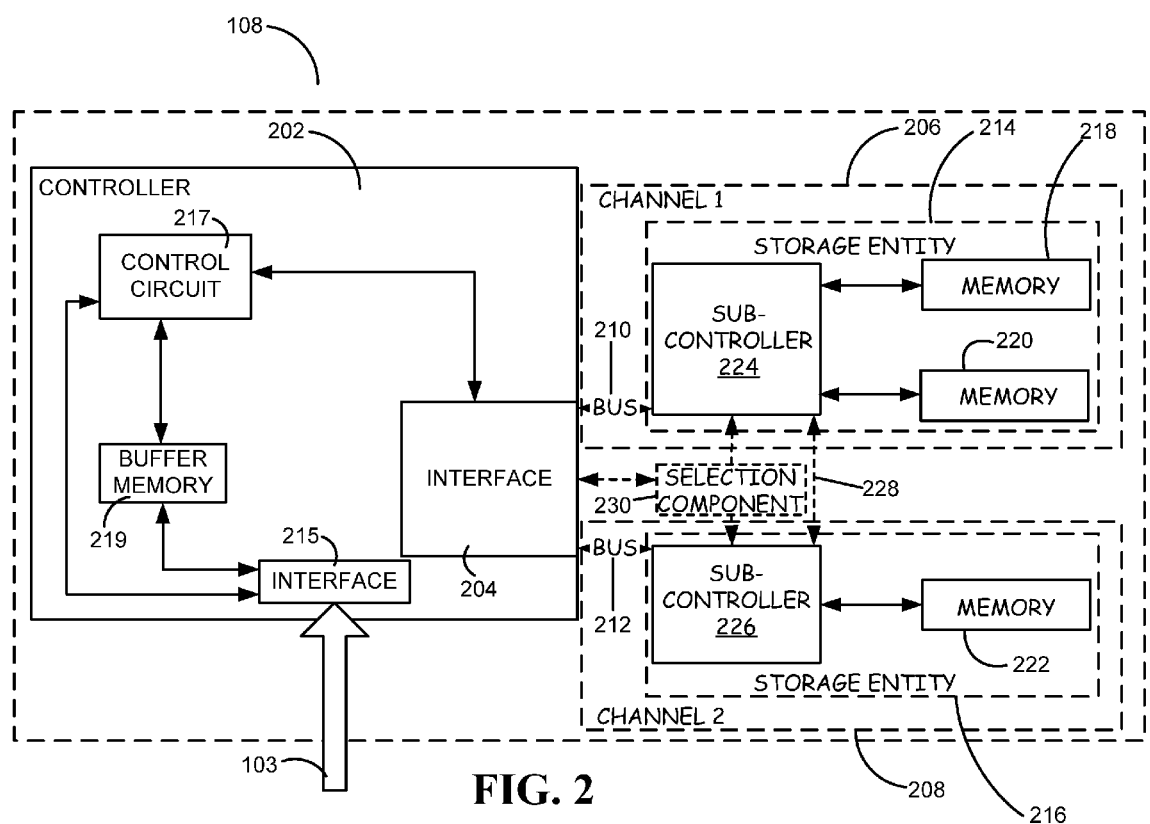
FIG. 2 is a diagram of another illustrative embodiment of a system of data distribution management.

Other capabilities may be best understood, or should be private to the individual storage entity. For example, data compression capability may be dynamic and dependent on a state of the storage included within the storage entity. Also, data de-duplication methods are dependent on the population of data currently stored, and with different data each storage entity will typically have varying data de-duplication ability for a particular new piece of data. In general, each storage entity 112, 114 includes communication circuitry (not shown in FIG. 1) that is capable of providing controller 110 with storage competency information for the respective storage entity 112, 114, which controller 110 utilizes to make data storage decisions. Storage entities 112 and 114 may also be capable of utilizing information/data received from controller 110 to make data storage decisions by communicating with each other without the involvement of the controller 110. FIG. 2 and the following description provide details regarding an embodiment of device 108.

Referring to FIG. 2, a particular embodiment of the memory device 108 is shown. The memory device 108 may include a controller 202, which includes a memory interface 204 that is coupled to a first channel (channel 1) 206 and a second channel (channel 2) 208, with each of the channels 206, 208 including at least one memory. In another embodiment, more channels may be coupled to interface 204. In the interest of simplification, circuitry within memory interface 204 that allows controller 202 to select one of channels 206 and 208 is not shown.

Each channel 206, 208 includes a communication bus 210, 212, which can include a data bus, an address bus, etc., and at least one storage entity 214, 216. Each storage entity 214, 216 may include at least one memory 218, 220, 222, and at least one sub-controller 224, 226. In some embodiments, one or more of memories 218, 220 and 222 are flash memories.

The controller 202 may be coupled to the system bus 103 via an interface 215 that can receive and send commands and data to a host, such as the processor 102 in FIG. 1. The interface 215 may pass the command to control circuit 217 for processing and also store the received data in a buffer memory 219. The buffer memory 219 may also include metadata (information that describes the content, quality, condition, origin, and/or other characteristics of data) associated with the data. The memory interface 204 can receive data from the buffer memory 219 to be written to one of storage entities 214 and 216 and/or the metadata associated with the data. Typically, the data and/or the metadata from buffer memory 219 are sent to both storage entities 214 and 216. Upon receiving a respective copy of the data and/or the metadata associated with the respective copy of the data, each sub-controller 224, 226 may respond to the controller 202 with storage competency information of the respective storage entity 214, 216 for the respective copy of the data. Upon receiving storage competency information from the storage entities 214 and 216, the controller 202, with the help of control circuit 217, selects a particular one of the storage entities 214 and 216 and notifies the selected storage entity 214, 216 to store the respective copy of the data. As indicated above, in an alternative embodiment, when each storage entity receives a respective copy of the data, the storage entities 214 and 216 may communicate among themselves and determine which of storage entities 214 and 216 is more competent to store the data and then proceed with the data storage operation without communicating back to control circuit 217. Of course, in such embodiments, if only the metadata associated with the respective copy of the data is sent to storage entities 214 and 216, control circuit 217 will have to be notified of the selected storage entity in order for the data to be sent by the control circuit 217 to the selected storage entity. In other embodiments, a selection component 230, which is separate from controller 202 and storage entities 214 and 216, is employed to determine which of the storage entities 214, 216 is more suitable to store the data. Examples of information contained in metadata and details regarding storage competency information are provided below.

As noted earlier, data compression ability and data de-duplication ability for a particular piece of data is best understood by the respective storage entity 214, 216. In general, compression capability may be dynamic and dependent on a state of storage within a storage entity such as 214, 216. Storage entities such as 214 and 216 may be incrementally compressing data to fill up a page or other atomic unit of programming, and a new piece of data (such as the earlier-noted newly received respective copy of data) may be more compressible when added to one storage entity as compared to another storage entity. This can occur when the new data has more information repetition with respect to the in-process data (data that is being incrementally compressed prior to the arrival of the new piece of data) on one storage entity than another. In some embodiments, compression ability may be determined by running a compression algorithm within sub-controller 224, 226 on some or all of the new piece of data and some or all of the in-process data in the storage entity 214, 216.

As noted above, data de-duplication methods are dependent on the population of data currently stored, and with different data each storage entity will typically have varying data de-duplication ability for a particular new piece of data. In some embodiments, data de-duplication ability of a storage entity such as 214, 216 may be estimated by carrying out a hash operation within sub-controller 224, 226 on some or all of the new piece of data and also carrying out a hash operation on a portion of the previously stored data. Data de-duplication ability of the storage entity 214, 216 is estimated based on a comparison of the results of the two hash operations.

In the embodiment shown in FIG. 2, storage competency information returned by the respective sub-controller 224, 226 to control circuit 217 may be based on compression ability of the respective storage entity 214, 216 for the respective copy of the data and/or data de-duplication ability of the respective storage entity 214, 216 for the respective copy of the data.

In one embodiment, storage competency information returned by the respective sub-controller 224, 226 to control circuit 217 may include an array of information that includes compression ability of the respective storage entity 214, 216 for the respective copy of the data, data de-duplication ability of the respective storage entity 214, 216 for the respective copy of the data and any other suitable categories of information that reflect storage competency of the respective storage entity 214, 216. Control circuit 217 examines the different categories of information received in the array sent by sub-controller 224 and also examines the different categories of information in the array sent by sub-controller 226. Based on the examination of the information in the arrays, control circuit 217 selects a particular one of the plurality of storage entities 214 and 216 and notifies the selected storage entity 214, 216 to store the respective copy of the data. It should be noted that in embodiments in which only metadata is sent to the storage entities 214 and 216, the storage competency information is typically non-data dependent.

In another embodiment, instead of returning an array of information, storage competency information returned by the respective sub-controller 224, 226 to control circuit 217 is a "vote" as to the cost-benefit of that storage entity 214, 216 being assigned to store that data. Control circuit 217 compares the votes much like bids, and notifies the "winning" storage entity 214, 216 that it is to complete the store procedure, while the other storage entity or storage entities are notified that they did not win and can discard the data.

In still another embodiment, upon receiving the respective copies of data, sub-controllers 224 and 226 communicate with each other, via communication link 228, and may decide, independently of controller 220, on which of the sub-controllers 224 and 226 is more suitable for storing the data. Thus, in this embodiment, storage competency information returned to control circuit 217 may include an array information from each storage entity 214, 216 and/or a vote form each storage entity and a decision on which of the sub-controllers 224 and 226 is more suitable for storing the data. Control circuit 217 may either instruct the sub-controllers 224 and 227 to proceed with their storage decision or override the decision based on other storage requirements/preferences, known only to control circuit 217 and unknown to sub-controllers 224 and 227. Also, as indicated above, storage entities 214 and 216 may vote among themselves and/or utilize selection component 230 to determine which of storage entities 214 and 216 is more competent to store the data and then proceed with the data storage operation without communicating back to control circuit 217.

In yet another embodiment, control circuit 217 is further configured to send weightings of storage competency contributors, along with the at least one of a respective copy of data and/or metadata associated with the respective copy of the data, to each of storage entities 214 and 216. In such an embodiment, storage entities 214 and 216 may be configured to provide the storage competency information to the control circuit 217 in a form of a single overall competency indication. Examples of information included in metadata, which includes storage competency contributors, are provided below.

Metadata sent to the sub-controllers 214 and 216 by the controller 212 can include:

A logical block address (LBA) list, which is a list of addresses of the data to be stored. A non-negative integer range, typically less than 2^48(where ^ is a symbol for exponent), is used to represent the LBAs sent to the sub-controllers.

Data size of interest, which is especially useful if the data to be stored is not sent to the sub-controllers along with the metadata. Sizes of blocks that make up a data object are typically either 512 or 4096 bytes, and the data size is usually no more than 2^16 blocks.

Compressibility or entropy estimate, which may be a DC level or a portion of bits that are ones. The compressibility or entropy value sent can range from 0 to 1, inclusive.

Temperature or heat estimate, which could reflect a general access frequency or be specific to the read or write accesses.

A list of information that may be sent by the sub-controllers to the controller, or for which the controller might specify relative weighting, can include:

Latency or responsiveness, which is how quickly the data can be stored. Units used to represent latency or responsiveness are units of time, for example, seconds (rational numbers) or a smaller unit (integer numbers). Values that latency or responsiveness can take are positive values, which have an upper limit of a second or a minute, for example. An example value of latency or responsiveness can be 148 microseconds.

Bandwidth, which is the sustained rate at which data can be stored. Units of bandwidth are data per time, for example, megabytes/second (MB/s) (rational numbers) or a finer unit. Bandwidth values are positive values having an upper limit of 1 gigabyte/second (GB/s) or 10 GB/s, for example.

Fragmentation, which relates to the degree to which storing the data increases or decreases the fragmentation of logical addresses in a physical address space. Units, ranges and example values of fragmentation are implementation dependent. In a particular implementation, an integer in a restricted range such as −8 to +8 that could represent change in the number of the smallest mapping units stored separately as fragments, is used.

Media in use, which is what portion of the media is currently allocated. This can have a value of 0 to 100%.

Media in use, which is what portion of the media is currently storing valid data. This can have a value of 0 to 100%.

Heat clumpiness is a degree to which storing data of a particular heat increases or decreases. Clumpiness may be measured in many ways. If data is tracked with a balanced tree, then the width (e.g. LBA range) represented by intermediate nodes at a particular height in the tree could be viewed as inversely-proportional to the clumpiness. If a set of N empirical clump centers is adaptively (by any process) decided upon, the clumpiness may be defined as inversely-proportional to a sum of sample variances of tracked data from their assigned clump centers (this sum is shown below):

$$\frac{\sum_{i=0}^{N-1}(x_i - ClumpCenter[FindAppropriateClumpIndex(x_i)])^2}{N-1},$$ Equation 1 where N is the number of tracked objects (such as LBAs). The sum of the variances could be anywhere from zero to a value near (½)*(maximum LBA range) for an N=2 case where only a minimum and maximum LBA are seen, up to nearly 1 for a large data set whose "FindAppropriateClumpindex" function is substantially sub-optimal.

It should be noted that $x_i$ does not have to be LBAs. $x_i$ can be any parameter that is tracked by a channel (another example would be: estimated frequency of rewrite of that data element in the future).

Thus, a way to spec a value range for "clumpiness" (which again, is 1/SumOfVariances) is to:

Specify that the parameter used for clumpiness estimation has the range of [min, max] (i.e., specified in minimum and maximum values), and units of [units] (i.e., specified in any suitable physical units).

Clumpiness will be between $(N-1)/(N*(max-min)^2)$ and infinity.

Units on clumpiness would be proportional to $[units]^{(-2)}$.

Practically, the upper limit of clumpiness would be bounded to a maximum value of interest, so that if the sum of variances is substantially small, it is thought of as "arbitrarily well-clumped" data. These numbers could be arbitrarily reduced to be members of rational numbers, integers, etc.

Alternatively, the parameters could first be normalized to a given range, such as (0 to 1). The parameter used for clumpiness estimation has the range of [0,1], and it would be unitless. Clumpiness will be between $(N-1)/(N)$ and infinity. Clumpiness would be unitless.

Again, practically, the upper limit of clumpiness would be bounded to a maximum value of interest, so that if the sum of variances is substantially small, it is simply thought of as "arbitrarily well-clumped" data. These numbers could be arbitrarily reduced to be members of rational numbers, integers, etc. Further, "sample variance" versus "population variance" could be ignored, so that a lower bound on clumpiness would be 1, or (when casting to integer results, for example) results could be truncated downwards, instead of rounding to the nearest integer value, in which case a resulting minimum clumpiness value would be 0.

An absolute value of clumpiness in each channel may not be of substantial interest. However, a change in clumpiness would be more important, were a datum stored there.

It should be noted that if an independent channel is almost empty, its clumpiness value should not carry much weight, but as it gets full, it might be substantially relevant.

In some embodiments, device 108 may keep all mapping information (mapping of logical blocks to physical memory blocks) within controller 202. Such embodiments may optionally have redundant data stored. In any case, in such embodiments, data integrity is a responsibility of controller 202 in that it can satisfy read requests only by passing on the requests to channels with valid and not obsolete data for a given logical block.

In embodiments in which device 108 is without redundant data, and mapping information is held within each channel, superseded copies must be invalidated on the non-winning channel. Subsequent reads that are broadcast as a request to some or all channels may only get a hit from one channel.

Embodiments of device 108 that desire data redundancy notify multiple channels that they won during a write, and the winners independently proceed in their store procedure. This can lead to obsolete copies on some channels. To avoid data integrity issues when channels each know about their stored data (their mapping) then timestamps or other equivalent sequence information needs to be associated with stored data. When reading the controller may get hits from multiple channels at which point only channels with the most recent sequence value have valid data.

In general, any suitable processor or suitable combination of processors along with one or more computer storage media may be used to implement control circuit 217. Similarly, sub-controllers 224 and 226 can each comprise one or more processors along with one or more computer storage media.

Figure 3:
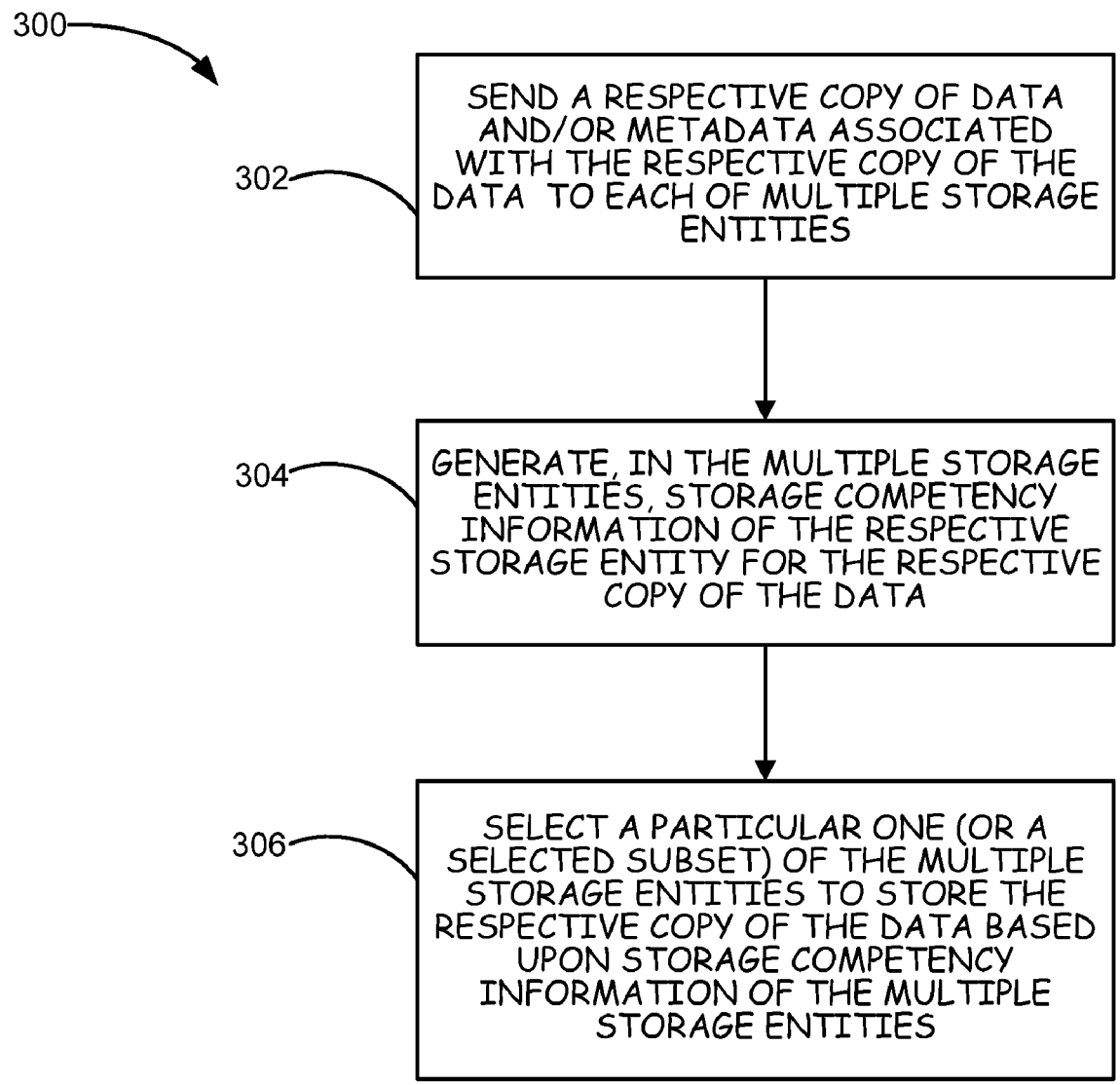
FIG. 3 is a flow diagram of an embodiment of a method of data distribution management.

Referring to FIG. 3, a very simplified flow diagram of a particular illustrative embodiment of a method of data distribution management is shown and generally designated 300. The method 300 may be implemented via controller 220 and sub-controllers 224 and 226. The method 300 may include sending a respective copy of data and/or metadata associated with the respective copy of the data to each of multiple storage entities at 302. The method may then include generating, in the multiple storage entities, storage competency information of the respective storage entity for the respective copy of the data, at 304. The method may also include selecting a particular one (or a selected subset) of the multiple storage entities to store the respective copy of the data based upon storage competency information of the multiple storage entities, at 306.

In accordance with various embodiments, the methods described herein may be implemented as one or more software programs running on a computer processor or controller, such as the controller 110 or the controller 202 and sub-controllers 224 and 226. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
a plurality of storage entities, each storage entity having a sub-controller; and
a controller communicatively coupled to each of the plurality of storage entities, wherein:
the controller is configured to send at least one of a respective copy of data or metadata associated with the respective copy of the data to each of the plurality of storage entities, and
upon receipt of the at least one of the respective copy of the data or the metadata associated with the respective copy of the data, each sub-controller provides storage competency information of the respective storage entity for the respective copy of the data, and
upon receiving storage competency information for the plurality of storage entities, the controller selects a particular one of the plurality of storage entities and notifies the selected storage entity to store the respective copy of the data.

2. The system of claim 1 wherein the controller is configured to send only the metadata to each of the plurality of storage entities and upon receipt of the metadata, each sub-controller provides storage competency information of the respective storage entity for the respective copy of the data.

3. The system of claim 2 wherein the storage competency information is non-data dependent.

4. The system of claim 1 wherein the controller is configured to send only the respective copy of the data to each of the plurality of storage entities and upon receipt of the respective copy of the data, each sub-controller provides storage competency information of the respective storage entity for the respective copy of the data.

5. The system of claim 1 wherein each of the plurality of storage entities is a part of a different channel that is communicatively coupled to the controller.

6. The system of claim 5 wherein the different channels are communicatively coupled in parallel with each other to the controller.

7. The system of claim 1 wherein each of the plurality of storage entities comprises at least one memory.

8. The system of claim 1 wherein the storage competency information of the respective storage entity for the respective copy of the data is based at least in part on a data compression ability of the respective storage entity for the respective copy of the data.

9. The system of claim 1 wherein the storage competency information of the respective storage entity for the respective copy of the data is based at least in part on a data de-duplication ability of the respective storage entity for the respective copy of the data.

10. The system of claim 1 wherein the storage competency information of the respective storage entity for the respective copy of the data comprises an array of storage competency categories with competency information for each category.

11. The system of claim 1 wherein the storage competency information of the respective storage entity for the respective copy of the data comprises a cost-benefit vote.

12. The system of claim 1 wherein the controller is further configured to send weightings of storage competency contributors, along with the at least one of a respective copy of data or metadata associated with the respective copy of the data, to each of the plurality of storage entities, and wherein the plurality of storage entities is configured to provide the storage competency information to the controller in a form of a single overall competency indication.

13. A system comprising:
a plurality of channels, each channel comprising at least one memory; and
a controller communicatively coupled to each of the plurality of channels, with the individual channels of the plurality of channels being in parallel with each other, wherein:
the controller is configured to send at least one of a respective copy of data or metadata associated with the respective copy of the data to each of the plurality of channels, and
upon receipt of the at least one of a respective copy of data or metadata associated with the respective copy of the data, each channel provides storage competency information for the respective copy of the data, and
wherein a particular one of the plurality of storage entities to store the respective copy of the data is selected based upon storage competency information of the plurality of storage entities.

14. The system of claim 13 wherein upon receiving storage competency information from the plurality of channels, the controller selects multiple ones of the plurality of channels and notifies the selected multiple ones of the plurality of channels to store the respective copies of the data.

15. The system of claim 13 wherein the storage competency information of the respective channel for the respective copy of the data is based at least in part on a data compression ability of the respective channel for the respective copy of the data.

16. The system of claim 13 wherein the storage competency information of the respective channel for the respective copy of the data is based at least in part on a data de-duplication ability of the respective channel for the respective copy of the data.

17. The system of claim 13 wherein the storage competency information of the respective channel for the respective copy of the data comprises one of an array of storage competency categories with competency information for each category or a cost-benefit vote.

* * * * *